United States Patent [19]

Koyama et al.

[11] Patent Number: 5,339,200

[45] Date of Patent: Aug. 16, 1994

[54] SIGNAL RECORDING APPARATUS WITH RERECORDING FACILITY

[75] Inventors: Shinichi Koyama, Tokyo; Nobutoshi Takayama, Kanagawa, both of Japan

[73] Assignee: Canon Kabushiki Kaisha, Tokyo, Japan

[21] Appl. No.: 841,822

[22] Filed: Feb. 26, 1992

[30] Foreign Application Priority Data

Mar. 1, 1991 [JP] Japan .................... 3-036181
Mar. 19, 1991 [JP] Japan .................... 3-054799

[51] Int. Cl.$^5$ ............................... G11B 15/20
[52] U.S. Cl. ..................... 360/24.2; 360/72.3; 360/74.2
[58] Field of Search ............... 360/14.2, 14.3, 72.3, 360/74.2

[56] References Cited

U.S. PATENT DOCUMENTS

| | | | |
|---|---|---|---|
| 3,646,260 | 2/1972 | Bolger | 360/14.2 |
| 4,341,363 | 7/1982 | Inatome | 360/73.04 |
| 4,482,926 | 11/1984 | Nishijima et al. | 360/14.2 |
| 4,520,406 | 5/1985 | Suzuki et al. | 360/14.2 |
| 4,673,991 | 6/1987 | Namiki et al. | 360/14.1 |
| 4,691,251 | 9/1987 | Ookawa et al. | 360/14.2 |
| 4,841,388 | 6/1989 | Hori | 360/13 X |

Primary Examiner—Edward K. Look
Assistant Examiner—Michael S. Lee
Attorney, Agent, or Firm—Robin, Blecker, Daley & Driscoll

[57] ABSTRACT

The present invention provides an improvement in the function of automatically rewinding a tape-shaped recording medium to an immediately previous recording start position or to an immediately previous stop position, and the accuracy of this rewinding is improved by using pulses according to the rotation of a capstan. A position to which the tape-shaped recording medium is to be rewound is accurately associated not with the immediately previous travel start position of the medium but with the immediately previous recording start position. Further, when the tape-shaped recording medium is to be stopped after the rewinding, the stop position is made to differ from the immediately previous stop position of the tape-shaped recording medium, thereby preventing damage to the medium. Further, meaningless rewinding is prevented by disabling the aforesaid function on the basis of the amount or elapsed time of tape travel from the immediately previous recording start position. Further, whether the function is enabled is displayed for the sake of convenience of a user. Further, during the aforesaid rewinding, a signal is reproduced so that the user can judge whether the rewinding has succeeded. Further, there is provided the function of cancelling the aforesaid function and causing the tape-shaped recording medium to travel to a position where it was located before this function was operated.

35 Claims, 11 Drawing Sheets

SIGNAL RECORDING APPARATUS WITH RERECORDING FACILITY

BACKGROUND OF THE INVENTION

1. Field of the Invention

The present invention relates to a signal recording apparatus and, more particularly, to a signal recording apparatus of the type utilizing a tape-shaped recording medium and having the function of returning the tape-shaped recording medium to a vicinity of a position where the tape-shaped recording medium was located in a past recording pause state.

2. Description of the Related Art

In recent years, video movie cameras (camcorders) of the type in which a video tape recorder (VTR) is integrated with a video camera have become popular, and many users have enjoyed video recording using such video movie cameras. During video recording, if a scene that is not desirable or intended is recorded, some of the users may desire to replace the unwanted scene with a new scene by rerecording. If a user is to perform this rerecording by means of conventional video equipment, he/she needs to perform the operation of returning a tape to an immediately previous recording end point while looking into a viewfinder or viewing a monitor screen, by using a particular function of a video tape recorder (VTR), such as reproduction (PLAY), search (CUE), rewind (REW) or fast forward (FF).

However, such an operation is extremely time-consuming, and it is virtually impossible for ordinary users to perform the operation at any time in any place. Nevertheless, under ordinary recording conditions, it is impossible to avoid the problem that a scene other than a desired scene is recorded.

In the field of video tape recorders (VTRs), U.S. Pat. No. 4,841,388 discloses an arrangement inclusive of the function of returning a tape to a past recording pause position whereby an ordinary user can easily perform rerecording. Such arrangement is in practice.

The function of the disclosed art will be described below in brief. In general, the arrangement of a recording apparatus such as a VTR is such that if a trigger switch is operated during a recording pause state, the apparatus proceeds from the recording pause state to a recording state, and if the trigger switch is again operated during the recording state, the apparatus returns to the recording pause state. In such an arrangement, the function of the disclosed art operates so that if a rerecording instruction is executed during the recording pause state, the tape is rewound to a position where it was located during an initial recording pause state. This function will be hereinafter referred to as a "recording cut function".

According to another known art, it is also possible to rewind the tape to the position where it was located during the aforesaid initial recording pause state, by executing a rerecording instruction during a recording state immediately after the initial recording pause state.

However, the given example does not consider what is called "tag recording" and its accuracy is not sufficient.

An additional problem is that it is undesirable to allow the above-described function to continue to operate for a long time after recording since the tape may be rewound in an excessively large amount due to an erroneous operation by an operator or the tape may be rewound to a long previous position which the operator is unable to recall.

SUMMARY OF THE INVENTION

It is, therefore, an object of the present invention to improve the function of rewinding a tape to a vicinity of a position where the tape was located during a past recording pause state.

Another object of the present invention is to provide a signal recording apparatus capable of achieving the above-described function with a far higher accuracy.

To achieve the above objects, in accordance with one aspect of the present invention, there is provided a signal recording apparatus which comprises a capstan for transporting a tape-shaped recording medium along a length thereof, a head for performing recording of a signal on the tape-shaped recording medium, a rotation detector for generating a pulse signal, according to a rotation of the capstan, a counter for counting the pulse signal, an operating member, and a control circuit capable of receiving a count value of the counter and arranged to control an operation of the capstan and an operation of the counter, the control circuit responding to an operation of the operating member to cause the capstan to make the tape-shaped recording medium travel to a vicinity of a past recording start position, according to the count value of the counter.

Another object of the present invention is to provide a signal recording apparatus which makes it possible to produce a noiseless reproduced signal even from a tag-recorded portion created by the above-described function.

To achieve the above object, in accordance with another aspect of the present invention, there is provided a signal recording apparatus which comprises transporting means for transporting a tape-shaped recording medium along a length thereof, recording means for performing recording of a signal on the tape-shaped recording medium, pulse generating means for generating a pulse signal according to a rotation of the transporting means, counting means for counting the pulse signal, first operating means for giving the recording means an instruction to start the recording, second operating means, first control means operative in response to an operation of the first operating means for causing the transporting means to start transporting the tape-shaped recording medium and then causing the recording means to start the recording and also initializing the counting means when a predetermined period elapses after the transporting means starts transporting, and second control means operative in response to an operation of the second operating means for causing the transporting means to make the tape-shaped recording medium travel to a vicinity of a past recording start position, according to a count value of the counting means.

Another object of the present invention is to provide a signal recording apparatus which can prevent a recording medium from being degraded due to the above-described function.

To achieve the above object, in accordance with another aspect of the present invention, there is provided a signal recording apparatus which comprises transporting means for transporting a tape-shaped recording medium along a length thereof, recording means for performing recording of a signal on the tape-shaped recording medium, operating means, and control means operative in response to an operation of the operating means for causing the transporting means to transport the tape-shaped recording medium to a vicinity of a position where the tape-shaped recording medium was located during an immediately previous recording pause, and bringing the tape-shaped recording medium to a stop when the vicinity of the position is reached, a stop position where the tape-shaped recording medium is brought to a stop by the control means being shifted by a predetermined amount from the position where the tape-shaped recording medium was located during the immediately previous recording pause.

Another object of the present invention is to provide a signal recording apparatus which makes it possible to utilize the above-described function by a simple operation and with no erroneous operation.

To achieve the above object, in accordance with another aspect of the present invention, there is provided a signal recording apparatus which comprises transporting means for transporting a tape-shaped recording medium along a length thereof, recording means for performing recording of a signal on the tape-shaped recording medium, operating means, control means operative in response to an operation of the operating means for causing the transporting means to transport the tape-shaped recording medium to a vicinity of a position where the tape-shaped recording medium was located at a start time of immediately previous recording, detecting means for detecting an amount by which the tape-shaped recording medium travels from the vicinity of the position where the tape-shaped recording medium was located at the start time of the immediately previous recording, and disabling means for disabling the operation of the operating means, according to an output of the detecting means.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 1:
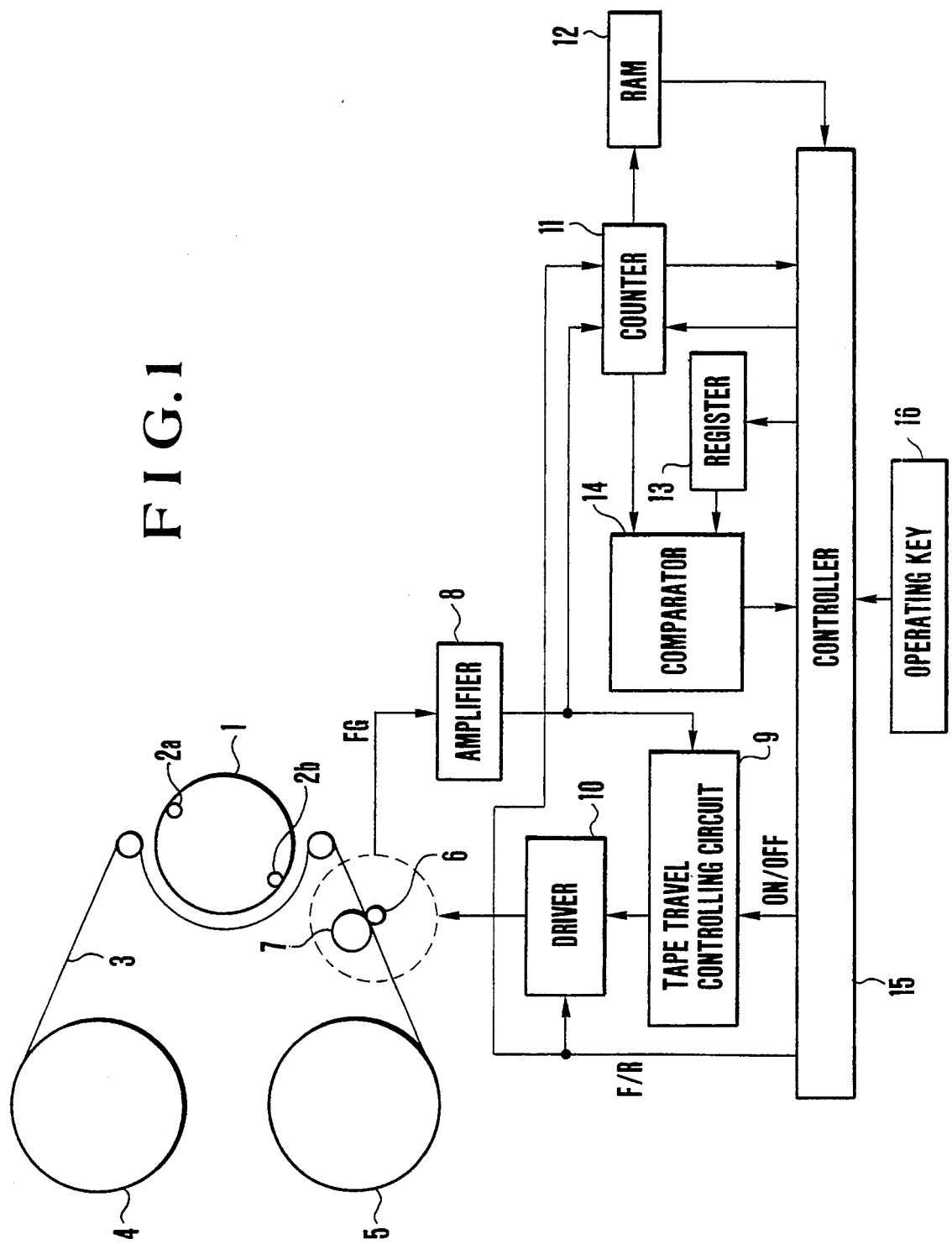
FIG. 1 is a schematic view showing the arrangement of the essential parts of a VTR according to an embodiment of the present invention.

FIG. 1 is a schematic view showing the arrangement of the essential parts of a VTR according to an embodiment of the present invention.

The arrangement shown in FIG. 1 includes a rotary drum 1 to which recording and reproducing heads 2a and 2b are secured and which is arranged to rotate on its axis, a magnetic tape 3, a supply reel 4, a take-up reel 5, a capstan 6, a pinch roller 7, an amplifier 8 for amplifying a capstan FG pulse which is a rotation detection signal corresponding to the rotation of the capstan 6, and a tape travel controlling circuit 9 for controlling the rotational speed of the capstan 6 on the basis of the capstan FG pulse amplified and waveform shaped by the amplifier 8. The shown arrangement also includes a driver 10 for driving a capstan motor, a counter 11 which constitutes counting means for counting up or down the number of capstan FG pulses in accordance with the direction of capstan rotation, a random access memory (RAM) 12 for storing the value of the counter 11, a register 13 in which count data on the capstan FG pulses corresponding to a target stop position of the tape 3 is to be set, a comparator 14 for comparing the value of the counter 11 with the value of the register 13 and transmitting, if these values coincide, a coincidence signal to a controller 15, and the controller 15 for receiving the count value of the counter 11, the contents of the RAM 12 and an output from the comparator 14 as well as an output from an operating key 16, and controlling the tape travel controlling circuit 9 and the driver 10 on the basis of the received signals. The controller 15 causes the magnetic tape 3 to travel up to a target position, for example, by transmitting to the driver 10 an instruction which designates the direction of capstan rotation (F(forward)/R(reverse)) or by transmitting to the tape travel controlling circuit 9 an instruction which designates the speed of rotation of the capstan 6. The controller 15 is provided with internal time measuring means to measure a time period which elapses during a recording operation. If the measured time period exceeds a predetermined time period, the controller 15 disables rerecording from being performed in the area of the magnetic tape 3 which is associated with the recording operation, as will be described later. The operating key 16 is used to input a mode change instruction into the controller 15.

Figure 2:
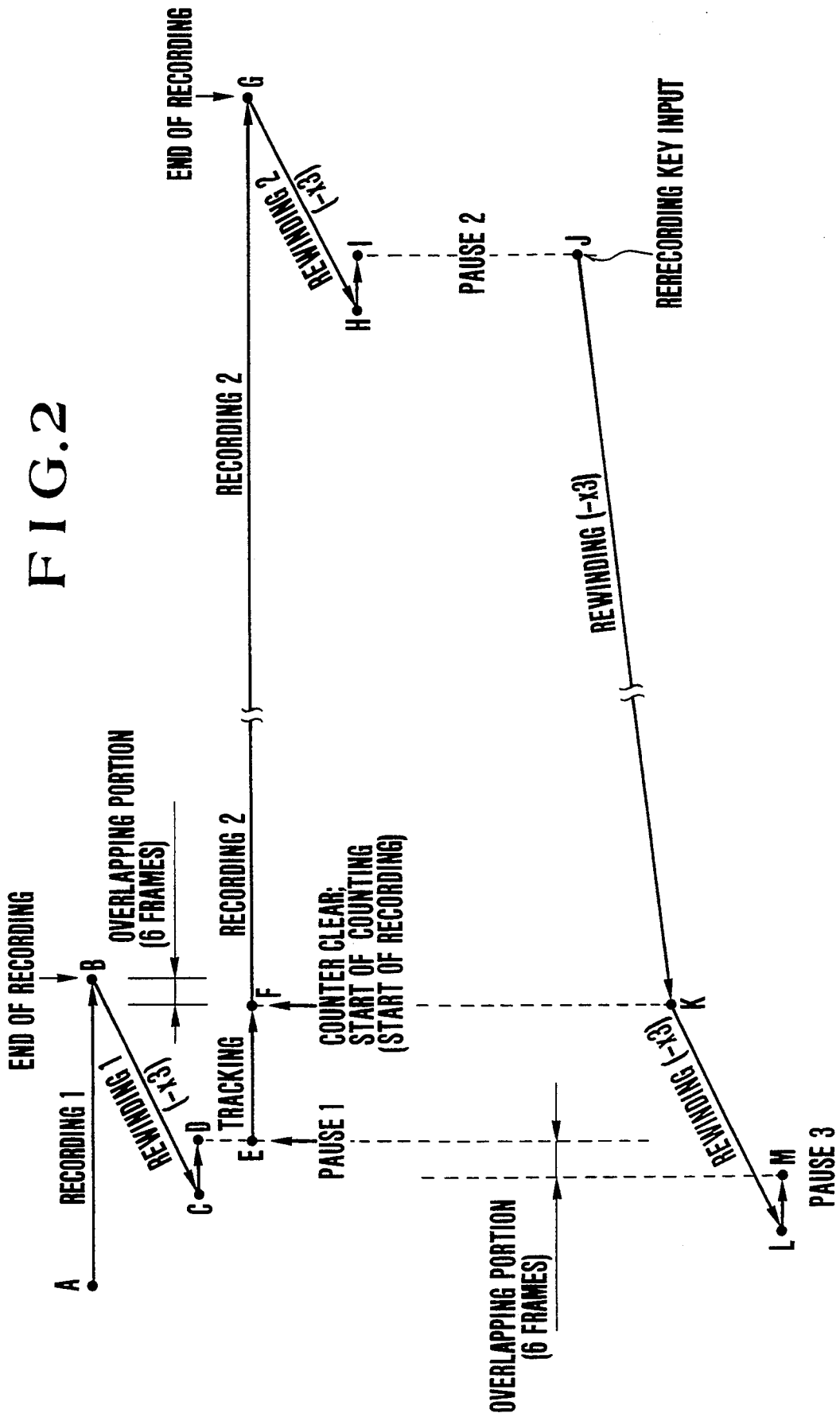
FIG. 2 is a view diagrammatically showing the manner of tape travel during the execution of a rerecording sequence in the VTR of FIG. 1.

Referring now to FIG. 2, the highly accurate operation of a recording cut function (rerecording operation) will be described. FIG. 2 diagrammatically shows the travel of a tape position in the sequence: recording 1→pause 1→recording 2→pause→rewinding→pause 3.

As is known to those skilled in the art, a tag recording operation in a rotary-head VTR requires a tracking operation to be performed after the completion of one recording operation and immediately before the start of the next recording operation. For this reason, a tape rewinding operation is performed prior to the tracking operation, and to return the state of tape travel which changed due to the reverse travel of the tape 3 at that time into an original state, a preparatory operation is performed, such as the operation of causing the tape 3 to travel forward to a small extent. In FIG. 2, each of the portions of point B→point C→point D, point-→point H→point I, and point K→point L→point M correspond to the above-described operations. It is desirable that such series of operations following the completion of recording be programmed as a common control sequence and controlled by the same software. An operation based on this software is hereinafter referred to as "pause operation". During the execution of this pause operation, the capstan 6 is controlled by the following method: First, the counter 11 is cleared (the value of the counter 11 is set to "0") at the point B, G or K, and after an FG pulse count value (a negative value selected as data common to the points B, G and K) corresponding to the associated point C, H or L has been set into the register 13 by the controller 15, the capstan 6 is activated to rotate in the return direction (in the reverse direction) at a target speed which is three times as great as the speed of rotation of the capstan 9 during recording. During this time, the counter 11 counts down the capstan FG pulses since the direction of rotation of the capstan 6 is the return direction. Subsequently, the comparator 14 compares the stored value of the register 13 corresponding to a target position with the count value of the counter 11 and, if both values coincide, outputs a capstan stop instruction. With the above-described operation, it is possible to accurately return the tape 3 to the target position. Subsequently, the tape 3 is made to travel forward from the point C, H or L to its associated point D, I or M, and comes to a pause at the point which the tape 3 has reached.

Figure 3:
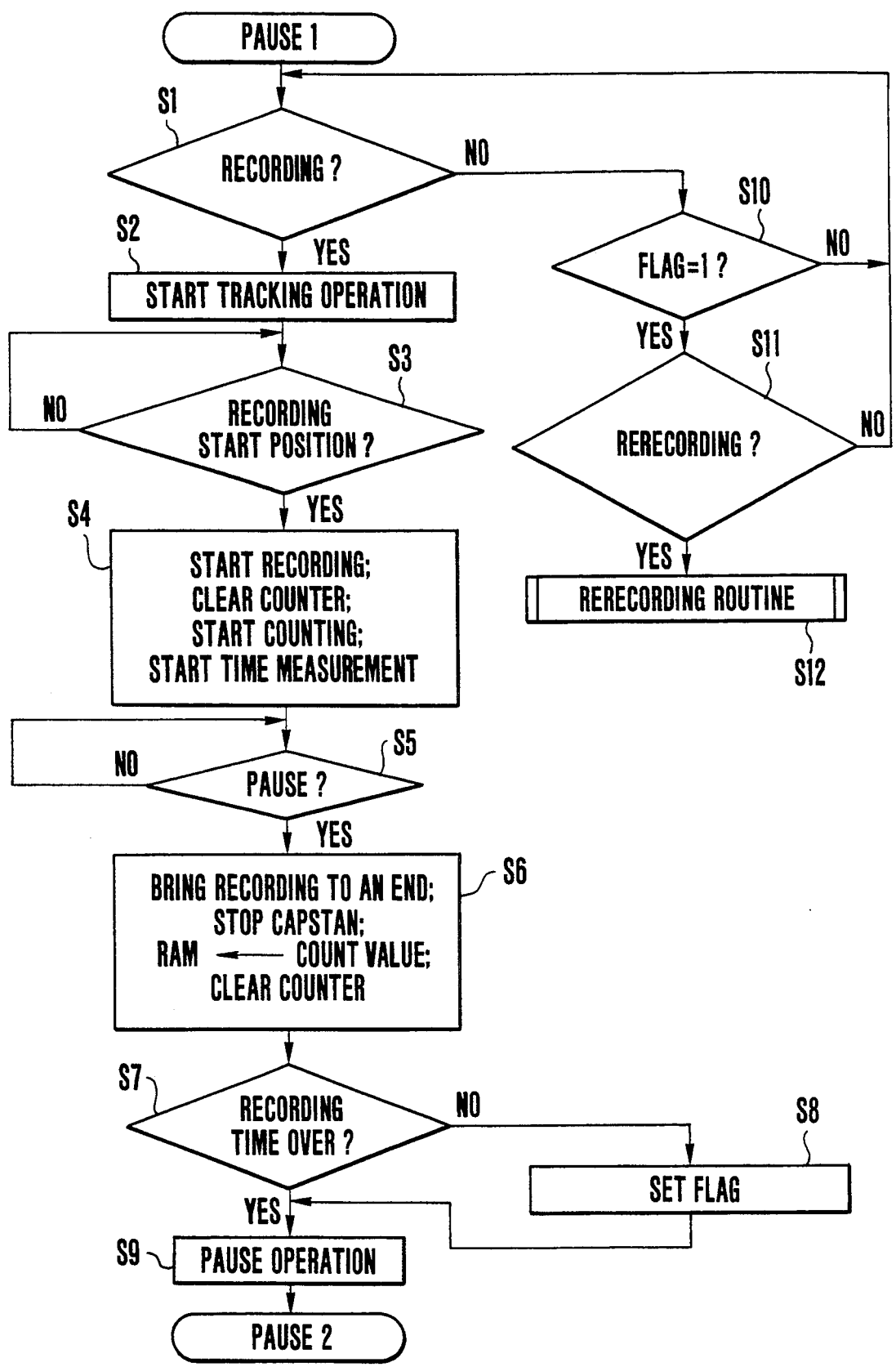
FIG. 3 is a flowchart showing a control procedure from pause 1 to pause 2, which is followed by the controller 15 shown in FIG. 1.

FIG. 3 is a flowchart showing a control procedure from the pause 1 to the pause 2, which is followed by the controller 15 shown in FIG. 1.

During the state of the pause 1 (the point E shown in FIG. 2), if it is detected in Step S1 that a recording key (trigger) of the operating key 16 has been operated, a tracking operation is started in Step S2. If a recording start position (the point F shown in FIG. 2) is detected in Step S3, supply of a recording current to the heads 2a and 2b is started in Step S4. Simultaneously, the counter 11 is initialized (e.g., 0 is set in the counter 11), and count-up of the capstan FG pulses is started.

Then, if it is detected in Step S5 that a pause key of the operating key 16 has been operated, the supply of the recording current to the heads 2a and 2b is stopped and the capstan 6 is stopped in Step S6. Subsequently, the count value of the counter 11 is transferred to the RAM 12, and the counter 11 is cleared. In Step S7, it is determined whether a time period which elapses during one recording operation has exceeded a predetermined time period. If such a time period has not exceeded the predetermined time period, the process proceeds to Step S8, where a flag (rerecording-possible flag) which indicates the completion of one recording operation is set. Subsequently, in Step S9, with the previously-described control method, the controller 15 performs a pause operation while causing the counter 11 to count the capstan FG pulses (pause 2 is reached). The process then proceeds to the control procedure shown in FIG. 4.

If it is not detected in Step S1 that the recording key has been operated, it is determined in Step S10 whether the value of the flag is "1". If it is determined that the value of the flag is not "1", the process returns to Step S1. If the value of the flag is "1", the process proceeds to Step S11, where whether a rerecording key of the operating key 16 has been operated is determined by supervising the state of the rerecording key. If the operation of the rerecording key is not detected, the process returns to Step S1. If the rerecording key is operated, the process proceeds to a rerecording routine which will be described later.

Figure 4:
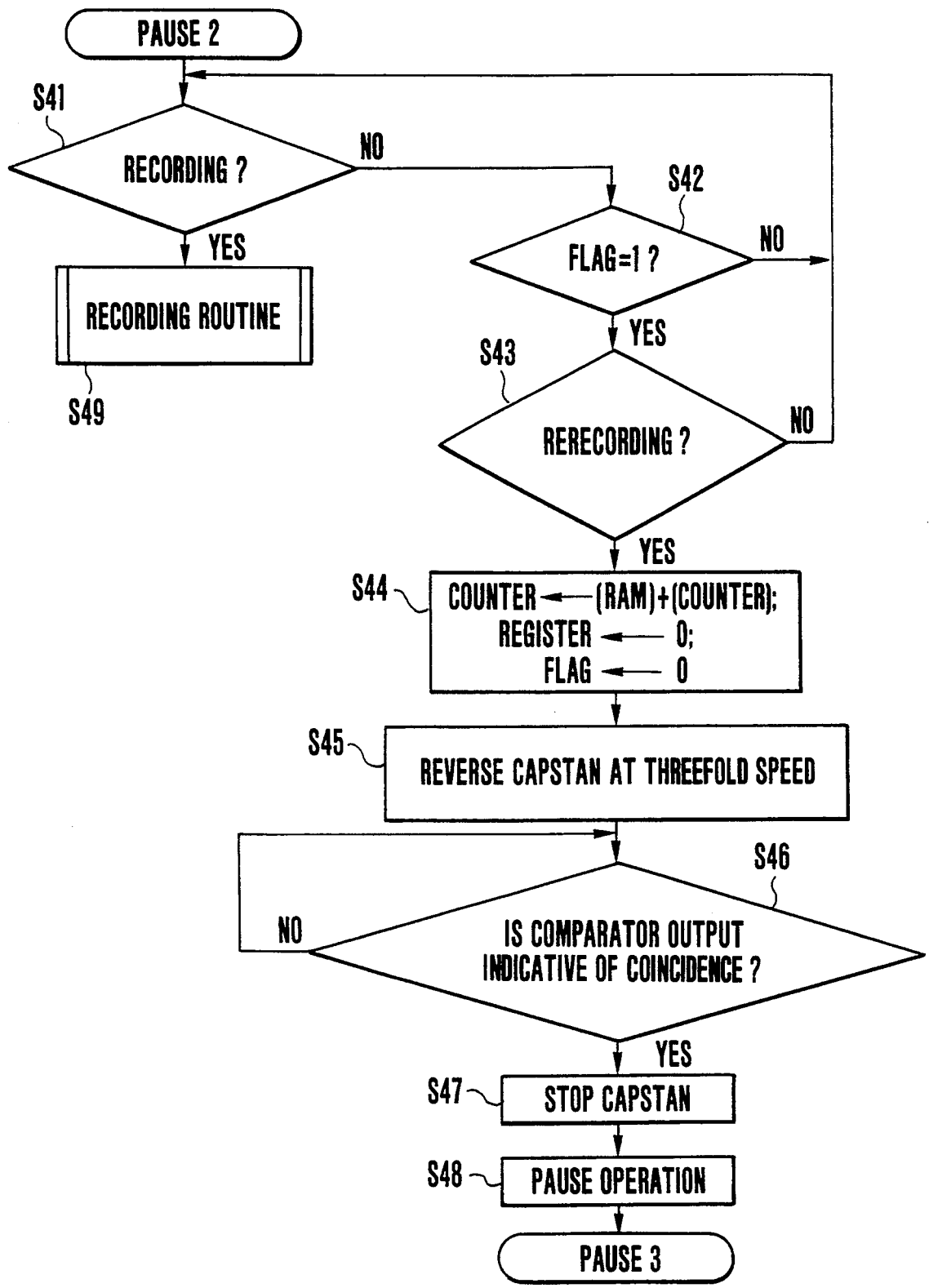
FIG. 4 is a flowchart showing a control procedure from pause 2 to pause 3, which is followed by the controller 15 shown in FIG. 1.

FIG. 4 is a flowchart showing a control procedure from the pause 2 to the pause 3, which is followed by the controller 15 shown in FIG. 1.

In Step S41, it is determined whether the operation of the recording key has been detected. Since the current state is the pause 2, the process proceeds to Step S42, where it is determined whether the value of the flag is "1". If the value of the flag is "1", the process proceeds to Step S43. If a rerecording instruction is received in Step S43, the process proceeds to the rerecording routine shown in Step S44 and subsequent steps. Specifically, in Step S44, the controller 15 reads out the count value of the counter 11 and the content data of the RAM 12, adds them together, and sets the sum in the counter 11 as an initial value. The value of the register 13 is set to "0" and the value of the flag is also set to "0". In Step S45, the controller 15 causes the counter 11 to count down the capstan FG pulses while causing the tape 3 to be rewound at a threefold speed (a speed three times as great as a standard speed). In Step S46, the count value of the counter 11 is compared with the value (=0) of the register 13. If it is determined that the count value of the counter 11 coincides with the value of the register 13, that is, if the count value of the counter 11 is "0", the process proceeds to Step S47, where the capstan 6 is stopped. In Step S48, a pause operation similar to the above-described pause operation is executed (the state of the pause 3 is reached).

As is apparent from the above description, the sum of the count value of the capstan FG pulses stored in the RAM 12 during the tape travel from the point F to the point G and the count value of the capstan FG pulses counted by the counter 11 during the tape travel from the point G to the point I corresponds to the amount of tape travel from the point F to the point I. Accordingly, it is possible to accurately rewind the tape 3 up to the point K by counting the capstan FG pulses.

In addition, the position of the point F is selected to correspond to a tape position which is offset by a minus value (the minus value of the number of capstan FG pulses for six frames) with respect to the count value of the counter 11 cleared at the point B, and the value of the counter 11 is again cleared at the start of recording. It follows, therefore, that a tape position (point D) corresponding to the pause 1 and a tape position (point M) corresponding to the pause 3 are shifted from each other by the amount of tape travel equal to the length of an overlapping portion. Accordingly, it is possible to prevent tape damage from being caused by a repetition of pauses with the tape 3 remaining at the same tape position.

During the time period of the recording 2, the counter 11 further counts the capstan FG pulses, but if the count value of the counter 11 reaches its maximum count value, a rerecording operation becomes difficult to perform. For this reason, at the point F, the counting operation of a time measuring counter for measuring a time period which elapses during the recording 2 is started, and if the count value (measured time period) of the time measuring counter is not less than a predetermined time period within the maximum count value at the time of completion of the recording 2, the rerecording-possible flag is not set. Accordingly, it is possible to perform recording on a proper tape position.

The above embodiment has been described with reference to the circuit example in which the counter 11, the RAM 12, the register 13 and the comparator 14 are arranged separately from the controller 15. However, these circuit elements may be assembled on a common printed circuit board (one chip).

As is apparent from the foregoing, in accordance with the VTR arrangement of the above-described embodiment, there is provided a signal recording apparatus which makes it possible to achieve a noiseless tag recording during rerecording and also which can prevent a tape-shaped recording medium from suffering serious damage owing to rerecording.

Figure 5:
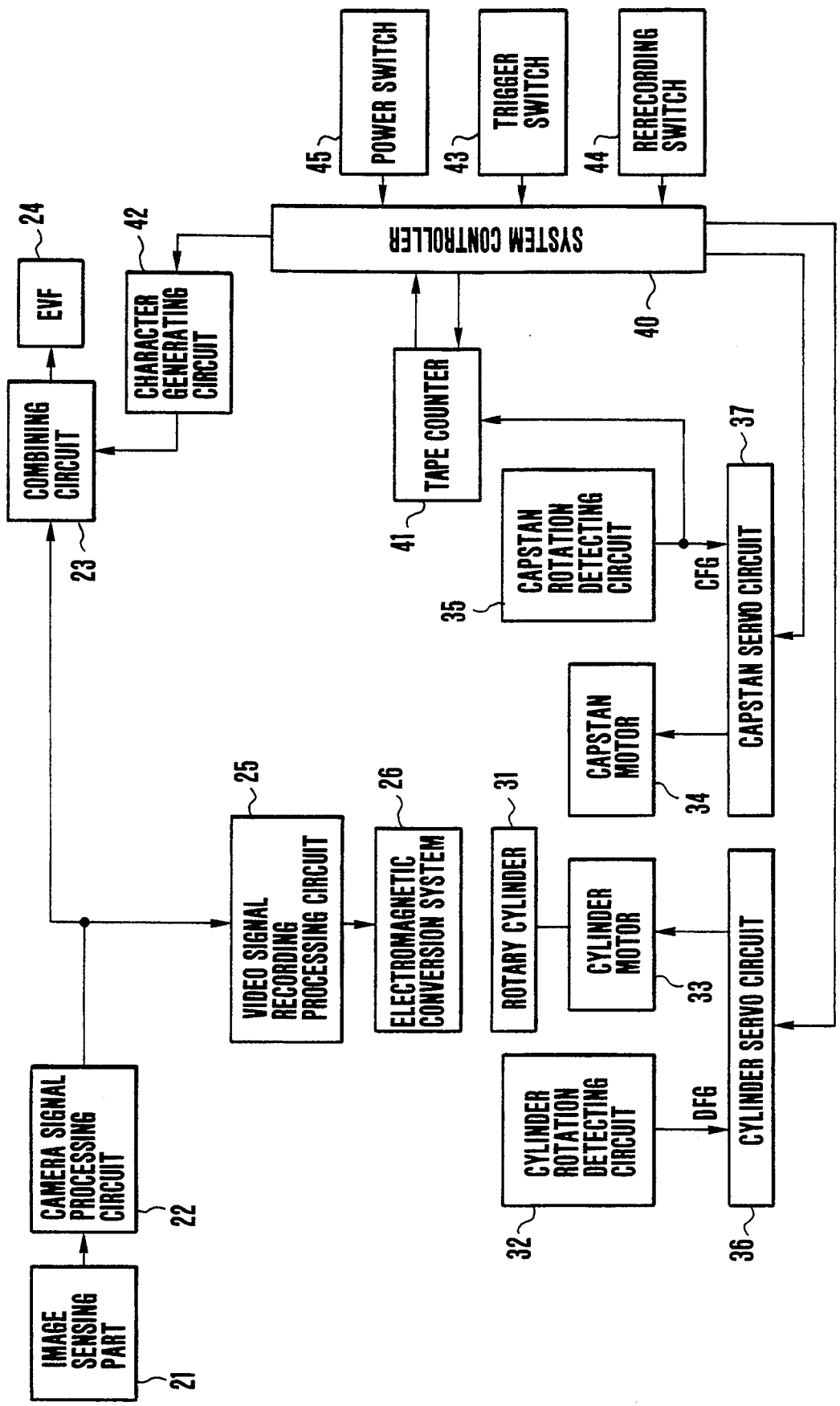
FIG. 5 is a block diagram schematically showing the construction of a camera-integrated type of VTR according to another embodiment of the present invention.

FIG. 5 is a block diagram schematically showing the construction of a camera-integrated type of VTR according to another embodiment of the present invention.

The VTR shown in FIG. 5 includes an image sensing part 21 for converting a subject image into an electrical signal and outputting the electrical signal, and a camera signal processing circuit 22 for converting the electrical signal supplied from the image sensing part 21 into a predetermined video signal. During recording, in a video signal recording processing circuit 25, the video signal outputted from the camera signal processing circuit 22 is converted into a signal format suitable for recording, and the resultant signal is recorded on a magnetic tape which is not shown by an electromagnetic conversion system 26.

During this time, the video signal outputted from the camera signal processing circuit 22 is also supplied to an electronic viewfinder (EVF) 24 via a combining circuit 23 for display purposes.

During this time, a system controller 40 operates to set the apparatus to a recording mode, in accordance with the operation of a trigger switch 43, a power switch 45 or other element which will be described later. More specifically, the system controller 40 causes a cylinder servo circuit 36 to make a cylinder motor 33 rotate at a predetermined speed, and causes a capstan servo circuit 37 to make a capstan motor 34 rotate at a predetermined speed.

Accordingly, a rotary magnetic head disposed on a rotary cylinder 31 is made to rotate at a predetermined speed, and the magnetic tape is transported at a predetermined speed by a capstan.

The cylinder servo circuit 36 receives a cylinder (drum) rotation frequency detection signal (DFG) from a cylinder rotation detecting circuit 32, and provides control so that the rotary cylinder 31 continues rotating at the predetermined speed. The capstan servo circuit 37 receives a capstan rotation frequency detection signal (CFG) from a capstan rotation detecting circuit 35, and provides control so that the capstan continues rotating at the predetermined speed.

The CFG is also supplied to a tape counter 41. The tape counter 41 counts signals obtained by frequency-dividing the CFG, and outputs a count value indicative of the position of the tape to the system controller 40. The system controller 40 supplies this count value to a character generating circuit 42, and causes it to generate a character signal of signal format which can be combined with a video signal. In the aforesaid combining circuit 23, such a character signal is combined with only a video signal to be displayed as a reproduced image in the EVF 24.

Figure 6:
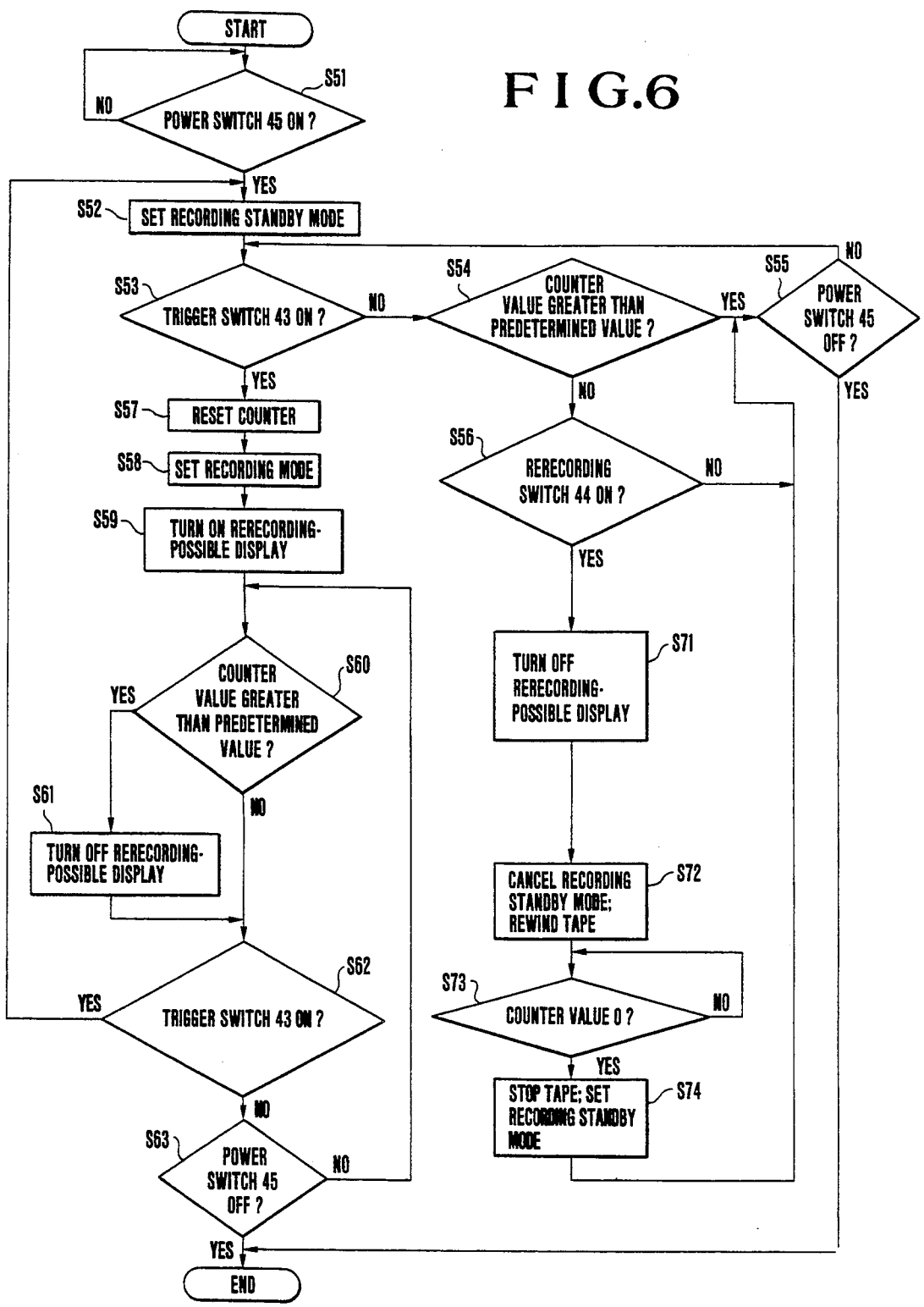
FIG. 6 is an explanatory flowchart showing the operation of a system controller in the VTR of FIG. 5.

FIG. 6 is an explanatory flowchart showing the operation of the system controller 40 in the VTR of FIG. 5, and the operation of this embodiment is described below with reference to the flowchart.

When the power switch 45 is turned on (Step S51), the VTR is set to a recording standby mode (Step S52). In the recording standby mode, the system controller 40 causes the cylinder servo circuit 36 to make the rotary cylinder 31 rotate at a predetermined speed, thereby placing the VTR in a state of being able to start recording immediately. In the meantime, the system controller 40 holds the rotation of the capstan in a stopped state through the capstan servo circuit 37.

In the above-described state, if the trigger switch 43 is operated (Step S53), the system controller 40 resets the count value of the tape counter 41 (Step S57) and makes the apparatus proceed to the recording mode (Step S58).

In the recording mode, the system controller 40 causes the capstan to rotate at the predetermined speed through the capstan servo circuit 37, and recording of video signals is performed by the electromagnetic conversion system 26 while helical tracks are being formed on the magnetic tape one after another through the rotary head which is rotating.

Figure 7:
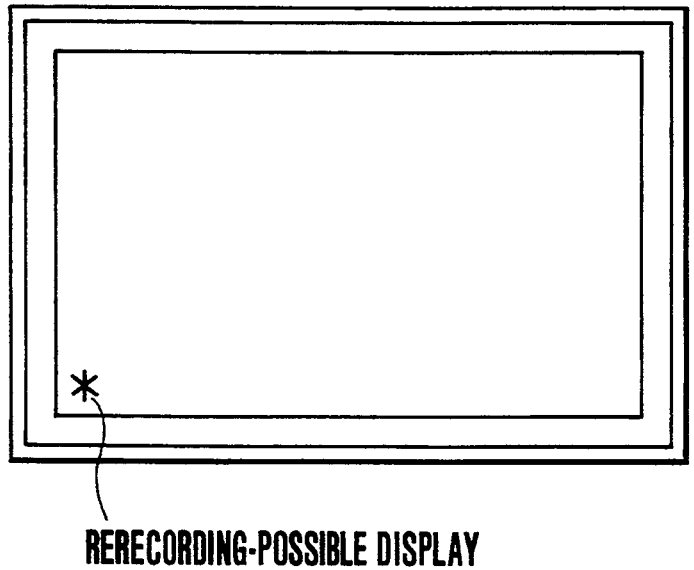
FIG. 7 is a schematic view showing one example of a rerecording-possible display in the VTR of FIG. 5.

The VTR according to this embodiment is provided with the function of causing the magnetic tape to travel to the position where it was located during the immediately previous recording standby (pause) mode, and if the apparatus proceeds to the recording mode, whether such a recording cut function (hereinafter referred to as "rerecording") can be carried out is displayed (Step S59). More specifically, the system controller 40 outputs an instruction to the character generating circuit 42, thereby providing a rerecording-possible display in the EVF 24 as shown in FIG. 7.

The count value of the counter 41 relative to the immediately previous recording standby mode has already been reset to "0" by the operation of Step S57. In this embodiment, however, if the count value of the counter 41 reaches a predetermined value, that is, if the tape travels by a predetermined amount from the tape position where it was located during the immediately previous recording standby mode, the above-described rerecording function is disabled.

In Step S60, during the recording mode, the count value of the counter 14 is consistently supervised to determine whether the count value has reached a predetermined value. If the predetermined value is reached, the aforesaid rerecording-possible display is turned off (Step S61).

During the above recording state, if the trigger switch 43 is again operated (Step S62), the VTR returns to the recording standby mode through Step S52.

In the above-described embodiment, the operation of the rerecording switch 44 is enabled only during the recording standby mode. More specifically, during the recording standby mode, if it is determined in Step S54 that the count value of the counter 41 is not greater than the predetermined value and if the rerecording switch 44 is operated (Step S56), the rerecording function shown in Step S71 and subsequent steps is carried out.

In Step S71, the aforesaid rerecording-possible display is turned off. In Step S72, the recording standby mode is cancelled and the capstan is made to rotate by means of the capstan servo circuit 37 in the direction opposite to the direction of rotation during the recording mode, thereby rewinding the magnetic tape.

Subsequently, if the count value of the counter 41 reaches "0" during the rewinding operation (Step S73), this indicates that the magnetic tape has returned to the tape position where it was located during the recording standby mode immediately before the recording. Accordingly, the transport of the magnetic tape by the capstan is stopped and the VTR is again set to the recording standby mode (Step S74).

During the recording standby mode or the recording mode, if the power switch 45 is turned off (Step S55 or S63), the process is brought to an end.

In the above-described embodiment, if the rerecording function can be performed subsequently to the completion of the aforesaid process, the recording-possible display such as that shown in FIG. 7 is provided in the EVF 24 at all times. Accordingly, since an operator can operate the rerecording switch 44 while consistently confirming the recording-possible display, it is possible to prevent occurrence of an operation error, for example, it is possible to prevent the operator from failing to perform desired rerecording.

In addition, since the operation of the rerecording switch 44 is disabled after long-time recording, even if the operator operates the rerecording switch 44 in error, there is no risk of the tape being rewound to a considerably previous recording position which the operator is unable to recall.

Figure 8:
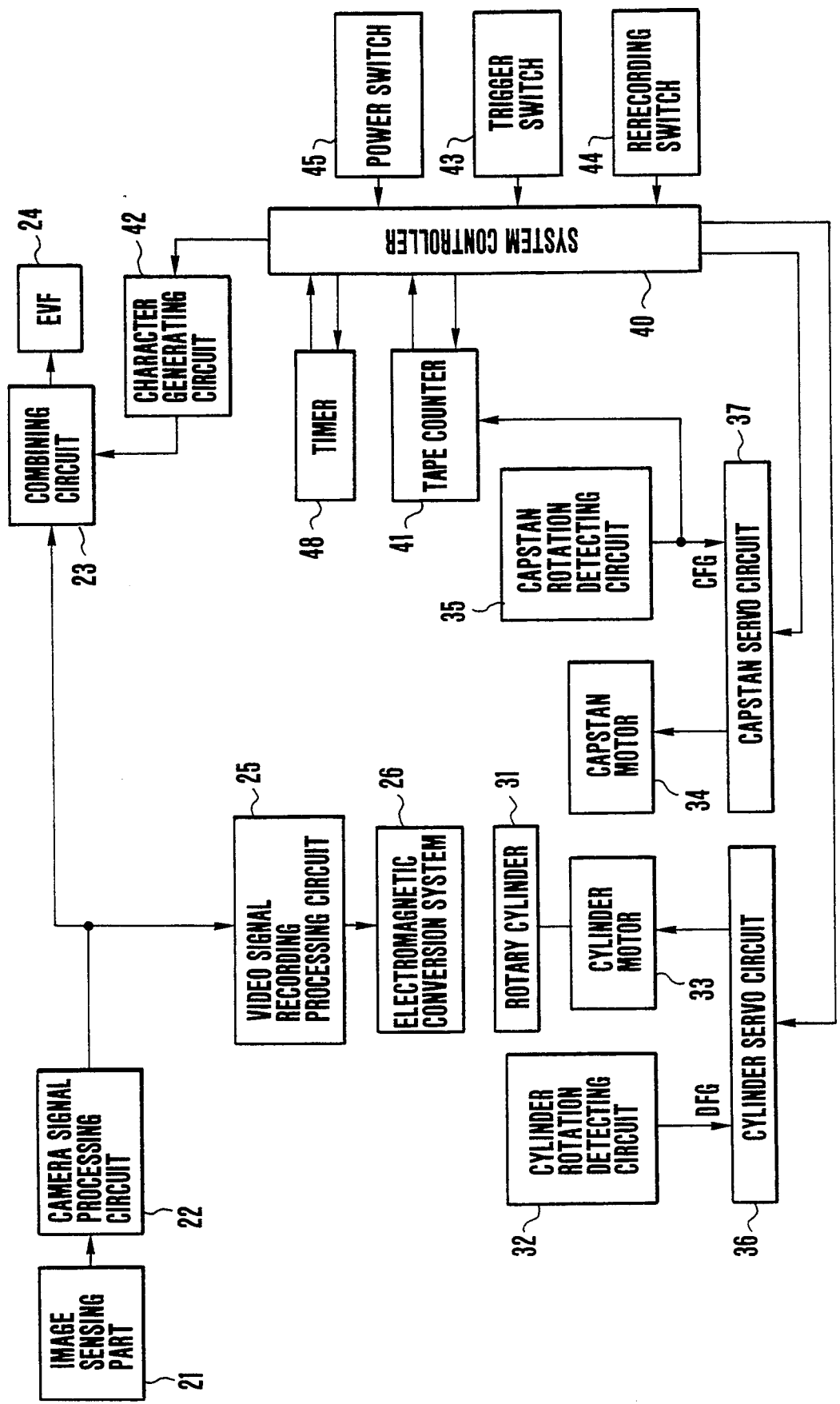
FIG. 8 is a block diagram schematically showing the construction of a camera-integrated type of VTR according to another embodiment of the present invention.
Figure 9:
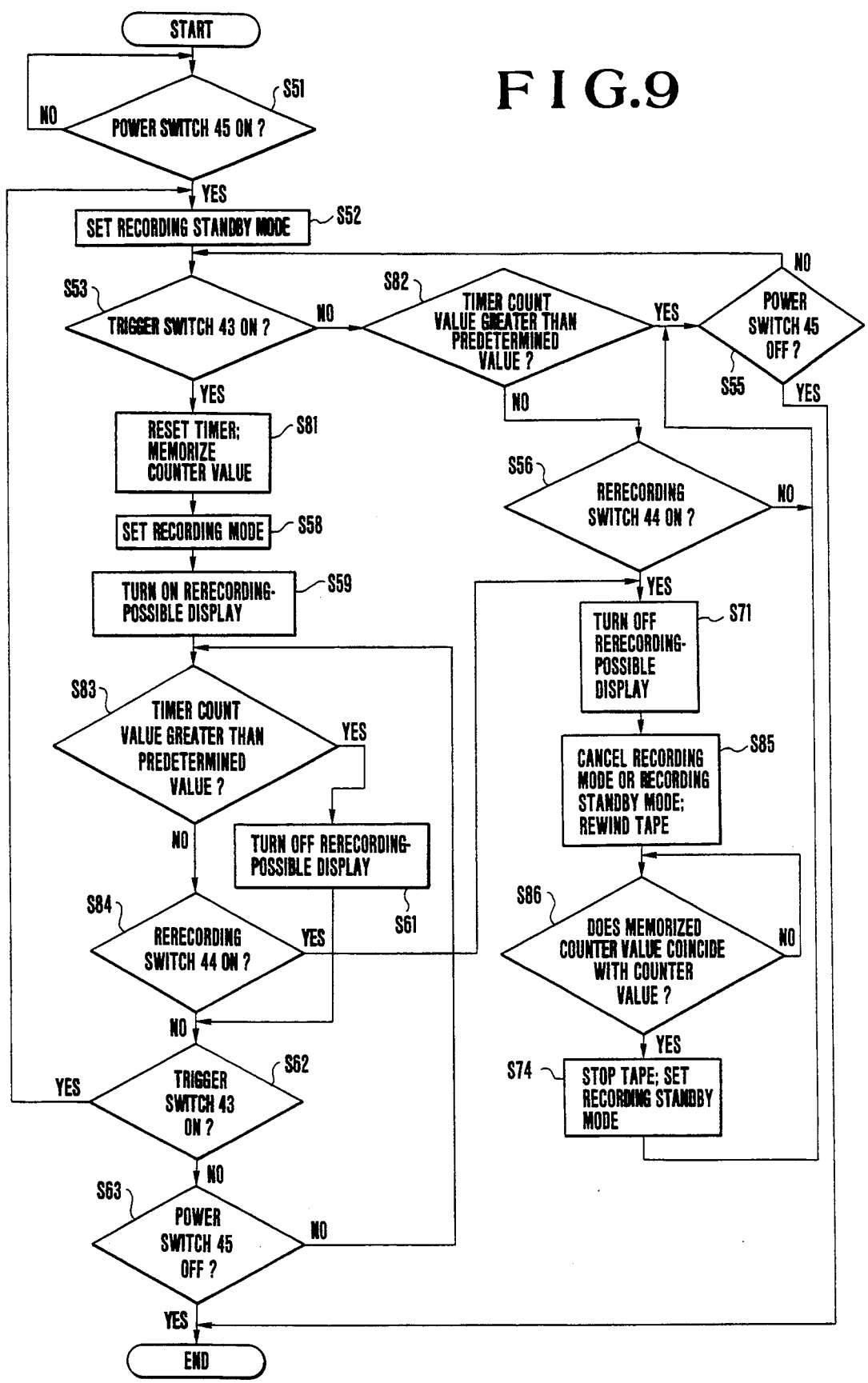
FIG. 9 is an explanatory flowchart showing the operation of a system controller in the VTR of FIG. 8.

FIG. 8 is a block diagram schematically showing the construction of a camera-integrated type of VTR according to still another embodiment of the present invention, and FIG. 9 is an explanatory flowchart showing the operation of the system controller 40 in the VTR of FIG. 8. In FIGS. 8 and 9, the same numerals are used to denote constituent elements and process steps which are similar to those of FIGS. 5 and 6, respectively, and a detailed description thereof is omitted.

The embodiment explained with reference to FIGS. 5 and 6 is arranged so that the rerecording function is disabled if the count value of the counter 41 reaches the predetermined value. However, the embodiment shown in FIGS. 8 and 9 is arranged so that the rerecording function is disabled if the count value of a timer 48 which is reset at the time of start of recording reaches a predetermined value.

More specifically, in this embodiment, as shown in Step S81 of FIG. 9, the trigger switch 43 is operated, and the timer 48 is reset and the count value of the counter 41 is memorized before the recording mode is set.

During the recording mode, if the count value of the timer 48 reaches a predetermined value in Step S83, the rerecording-possible display is turned off in Step S61. In the case of the recording standby mode as well, in a manner similar to that explained in connection with FIG. 6, it is confirmed in Step S82 that the count value of the timer 48 has not reached the predetermined value, and the operation of the rerecording switch 44 (Step S56) is enabled.

Further, in the above-described embodiment, in the case of the recording mode as well, it is possible to make the apparatus proceed to the rerecording mode by the operation of the rerecording switch 44. More specifically, during the recording mode, if the rerecording switch 44 is operated (Step S84), the process proceeds to Step S71 as when the recording switch 44 is operated during the recording standby mode, and the apparatus is made to proceed to the rerecording mode.

The rerecording mode according to the above-described embodiment is as follows. In Step S85, the recording mode or the recording standby mode is cancelled and the magnetic tape is rewound. In Step S86, if it is determined that the stored count value of the counter 41 coincides with the present count value of the counter 41, the tape is stopped, and the apparatus is made to proceed to the recording standby mode (Step S74).

In the above-described embodiment as well, it is, of course, possible to achieve advantages similar to those of the previously-described embodiment. In addition, in the above-described embodiment, since the apparatus can be made to proceed to the rerecording mode by a single key operation whether from the recording mode or the recording standby mode, operability is further improved.

Figure 10:
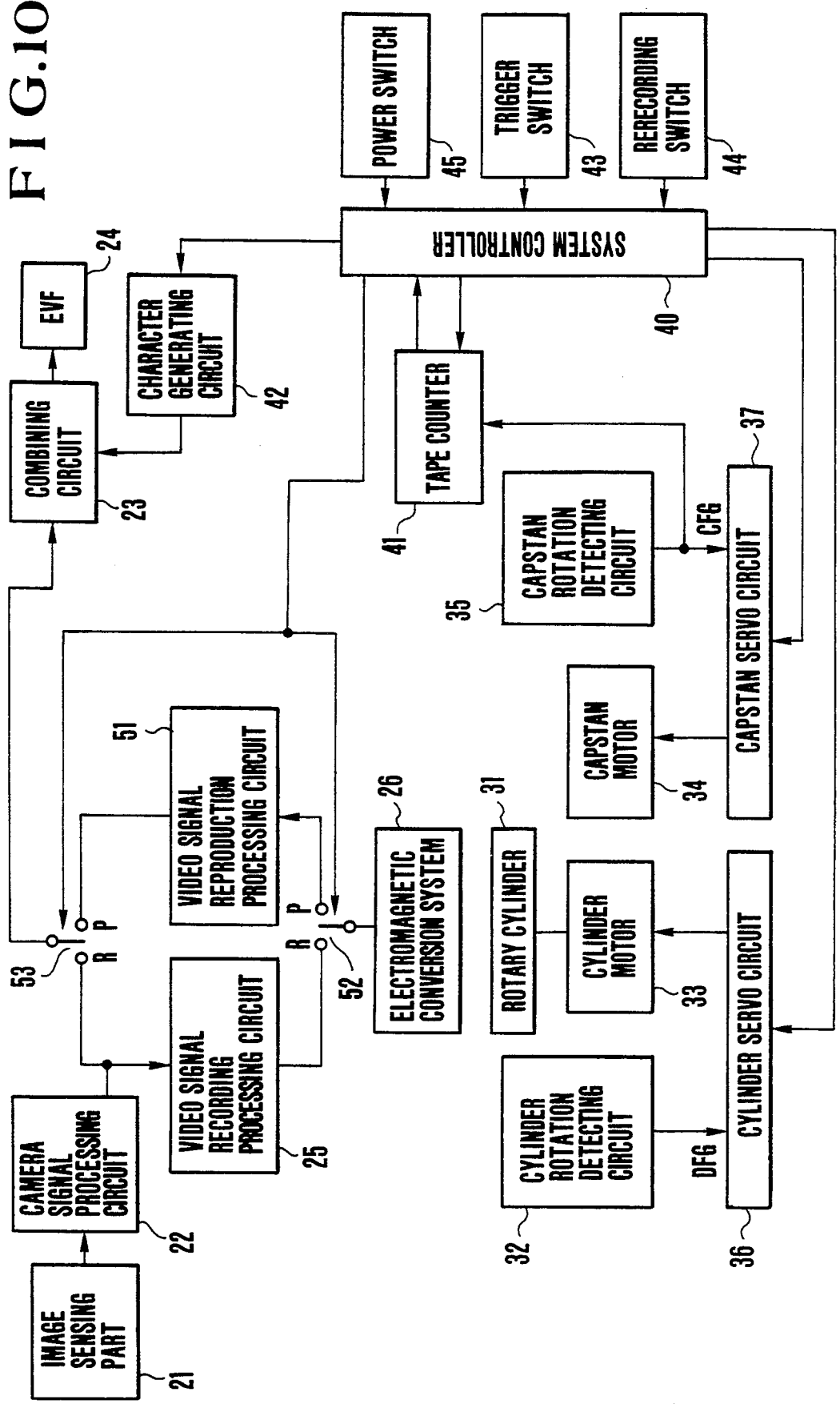
FIG. 10 is a block diagram schematically showing the construction of a camera-integrated type of VTR according to another embodiment of the present invention.
Figure 11:
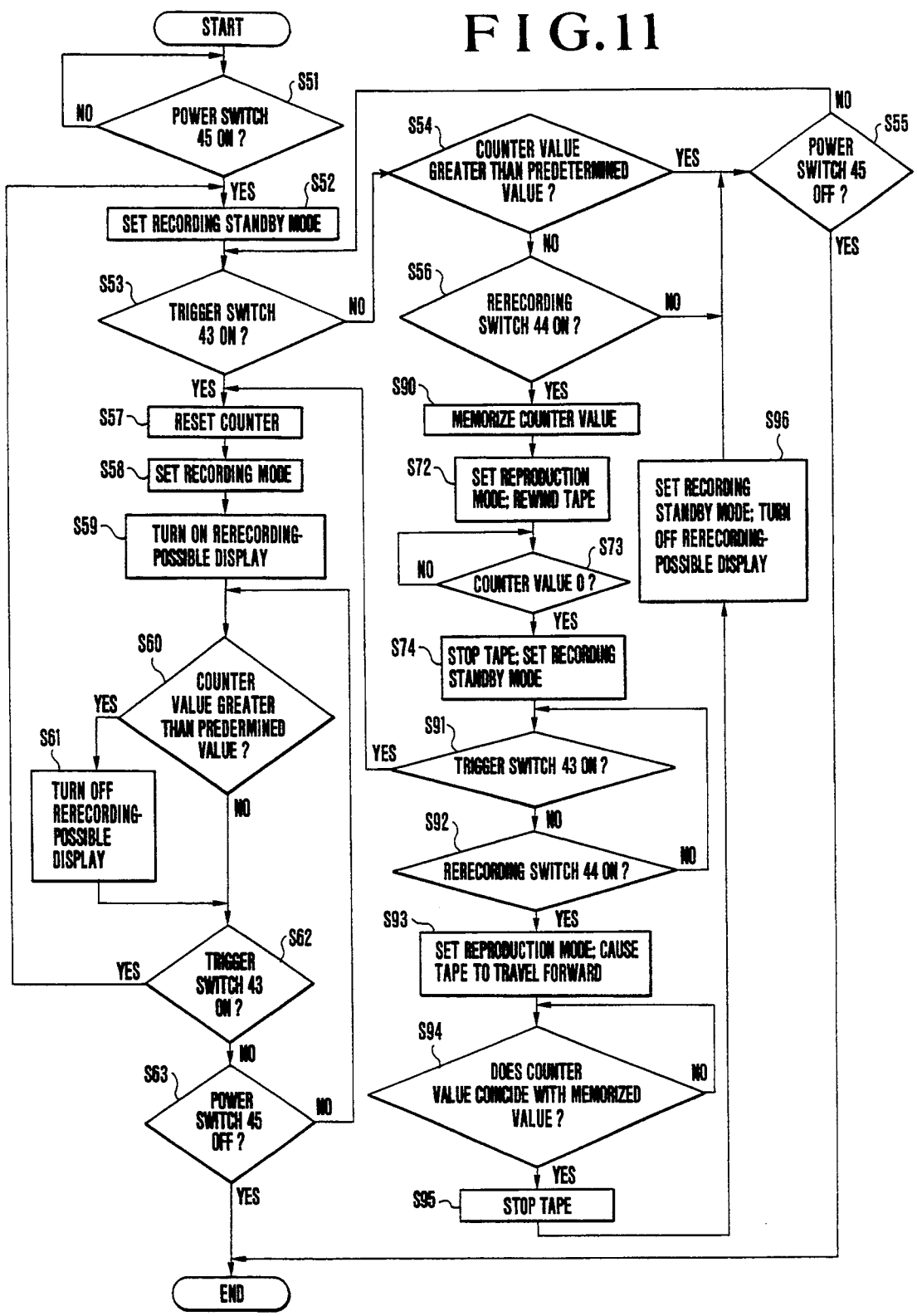
FIG. 11 is an explanatory flowchart showing the operation of a system controller in the VTR of FIG. 10.

FIG. 10 is a block diagram schematically showing the construction of a camera-integrated type of VTR according to a further embodiment of the present invention, and FIG. 11 is an explanatory flowchart showing the operation of the system controller 40 in the VTR of FIG. 10. In FIGS. 10 and 11, the same numerals are used to denote constituent elements and process steps which are similar to those of FIGS. 10 and 11, respectively, and a detailed description thereof is omitted.

The embodiment which will be described below is arranged so that while a magnetic tape is being rewound in the rerecording mode, the apparatus is placed in a reproduction mode to perform reproduction of a video signal recorded on the magnetic tape.

Referring to FIG. 10, an element 51 is a video signal reproduction processing circuit and switches 52 and 53 are recording/reproduction selecting switches. Each of the switches 52 and 53 is controlled by the system controller 40 so that it is switched to its side R when the recording mode is selected, or to its side P when the reproduction mode is selected.

Referring to FIG. 11, if the rerecording switch 44 is operated in Step S56, tape rewinding is performed and the apparatus is made to proceed to the reproduction mode in Step S72. At this time, a video signal reproduced by the electromagnetic conversion system 26 is supplied to a video signal reproduction processing circuit 51 through the P-side terminal of the switch 52, and the video signal is restored to a video signal of predetermined signal format. This video signal is reproduced as a visual display in the EVF 24 through the P-side terminal of the switch 53 and the combining circuit 23.

In the above-described embodiment, the rerecording-possible display is not turned off immediately after the apparatus has proceeded to the rerecording mode, and a reproduced video signal and the rerecording-possible display are combined in the combining circuit 23 and displayed in the EVF 24.

In the above-described embodiment, the apparatus is made to proceed to the recording standby mode upon completion of the rerecording mode (Step S74). At this time, if the trigger switch 43 is operated (Step S91), the apparatus is immediately made to proceed to the recording mode and rerecording is performed. During the recording standby mode, if the rerecording switch 44 is again operated (Step S92), the VTR again proceeds to the reproduction mode and the tape is made to travel to the tape position where it was located when the rerecording switch 44 was initially operated in Step S56 (Step S93).

To realize the above-described operation, if the rerecording switch 44 is operated in Step S56, the count value of the counter 41 at that time is memorized (Step S90), and the memorized value is compared with the count value of the counter 41 (Step S94). If both coincide with each other, the tape transport is stopped (Step S95). Then, the apparatus is made to return to the recording standby mode and the rerecording-possible display is turned off at this time (Step S96).

The VTR arrangement according to the above-described embodiment has the following advantages in addition to advantages similar to those of the embodiment described with reference to FIGS. 5 and 6. Since a reproduced image is displayed during the rerecording mode, an operator can again confirm whether the rerecording is appropriate. Accordingly, it is possible to prevent the problem that the operator erroneously judges whether the VTR has been set to the rerecording mode or he/she erroneously rerecords a new scene onto a scene that must not be erased.

Further, in the above-described embodiment, if a scene that must not be erased is contained in the portion of the tape which has been rewound during the rerecording mode, the operator can immediately cancel the rerecording mode. Accordingly, the operator can operate the apparatus very safely.

For the sake of simplicity of explanation, each of the embodiments has been described with reference to the recording mode, the recording standby mode and the rerecording mode. However, it is a matter of course that any of the embodiments may also be provided with other modes such as a reproduction mode, a high-speed search mode and a tape fast forward mode.

During the tape rewinding mentioned in connection with FIG. 11, reverse reproduction and normal reproduction are carried out while the tape is being transported. During this time, however, high-speed reverse reproduction and high-speed reproduction may also be carried out.

As is apparent from the foregoing description, in accordance with the camera-integrated type VTR according to the aforesaid embodiment, the function of returning a tape to a tape position where it was located in a past recording pause state can be utilized by a simple operation and with no erroneous operation.

What is claimed is:

1. A signal recording apparatus comprising:
   (a) a capstan for transporting a tape-shaped recording medium along a length thereof;
   (b) a head for performing recording of a signal on the tape-shaped recording medium;
   (c) a rotation detector for generating a pulse signal, according to a rotation of said capstan;
   (d) a counter for counting the pulse signal;
   (e) an operating member;
   (f) a control circuit capable of receiving a count value of said counter and arranged to control an operation of said capstan and an operation of said counter, said control circuit responding to an operation of said operating member to cause said capstan to make the tape-shaped recording medium travel to a vicinity of a past recording start position, according to the count value of said counter;
   (g) detecting means for detecting an amount by which the tape-shaped recording medium travels from the vicinity of the position where the tape-shaped recording medium was located at the start time of the immediately previous recording; and
   (h) disabling means for disabling the operation of said operating member, according to an output of said detecting means.

2. An apparatus according to claim 1, wherein said control circuit initializes said counter in response to a start of the recording of the signal by said head.

3. An apparatus according to claim 2, wherein said control circuit has a memory for storing a count value of said counter in response to an end of the recording of the signal by said head and initializes said counter in response to the end of the recording of the signal by said head.

4. An apparatus according to claim 3, wherein said control circuit causes said capstan to transport the tape-shaped recording medium by a predetermined amount in a direction opposite to a direction in which the tape-shaped recording medium is transported during the recording, in response to the end of the recording of the signal by said head, and brings the tape-shaped recording medium to a stop when the predetermined amount is reached.

5. An apparatus according to claim 4, wherein said control circuit places in said counter a result of computations on the count value stored in said memory and a count value of said counter and causes said capstan to transport the tape-shaped recording medium in the direction opposite to the direction in which the tape-shaped recording medium is transported during the recording, in response to an operation of said operating member, and brings the tape-shaped recording medium to a stop according to a count value of said counter.

6. A signal recording apparatus comprising:
   (a) a capstan for transporting a tape-shaped recording medium along a length thereof;
   (b) recording means for performing recording of a signal on the tape-shaped recording medium;
   (c) pulse generating means for generating a pulse signal according to a rotation of said capstan;
   (d) counting means for counting the pulse signal;
   (e) an operating member;
   (f) control means operative in response to an operation of said operating member for causing said capstan to make the tape-shaped recording medium travel to a vicinity of a past recording start position, according to a count value of said counting means;
   (g) detecting means for detecting an amount by which the tape-shaped recording medium travels from the vicinity of the position where the tape-shaped recording medium was located at the start time of the immediately previous recording; and
   (h) disabling means for disabling the operation of said operating member, according to an output of said detecting means.

7. A signal recording apparatus comprising:
   (a) transporting means for transporting a tape-shaped recording medium along a length thereof;
   (b) recording means for performing recording of a signal on the tape-shaped recording medium;
   (c) pulse generating means for generating a pulse signal according to a rotation of said transporting means;
   (d) counting means for counting the pulse signal;
   (e) a first operating member for giving said recording means an instruction to start the recording;
   (f) a second operating member;

(g) first control means operative in response to an operation of said first operating member for causing said transporting means to start transporting the tape-shaped recording medium and then causing said recording means to start the recording and also initializing said counting means when a predetermined period elapses after said transporting means starts transporting;

(h) second control means operative in response to an operation of said second operating member for causing said transporting means to make the tape-shaped recording medium travel to a vicinity of a past recording start position, according to a count value of said counting means;

(i) detecting means for detecting an amount by which the tape-shaped recording medium travels from the vicinity of the position where the tape-shaped recording medium was located at the start time of the immediately previous recording; and (j) disabling means for disabling the operation of said second operating member, according to an output of said detecting means.

8. An apparatus according to claim 7, wherein said first control means causes said transporting means to transport the tape-shaped recording medium by a predetermined amount in a direction opposite to a direction in which the tape-shaped recording medium is transported during the recording and brings the tape-shaped recording medium to a stop when the predetermined amount is reached.

9. An apparatus according to claim 8, wherein said second control means has a memory for storing a count value of said counting means and selectively initializes said counter.

10. An apparatus according to claim 9, wherein said second control means places in said counting means a result of computations on the count value stored in said memory and a count value of said counting means and causes said transporting means to transport the tape-shaped recording medium in the direction opposite to the direction in which the tape-shaped recording medium is transported during the recording, in response to an operation of said second operating member, and brings the tape-shaped recording medium to a stop according to a count value of said counting means.

11. A signal recording apparatus comprising:

(a) transporting means for transporting a tape-shaped recording medium along a length thereof;

(b) recording means for performing recording of a signal on the tape-shaped recording medium;

(c) an operating member;

(d) control means operative in response to an operation of said operating member for causing said transporting means to transport the tape-shaped recording medium to a vicinity of a position where the tape-shaped recording medium was located during an immediately previous recording pause, and brining the tape-shaped recording medium to a stop when the vicinity of the position is reached, a stop position where the tape-shaped recording medium is brought to a stop by said control means being shifted by a predetermined amount from the position where the tape-shaped recording medium was located during the immediately previous recording pause;

(e) detecting means for detecting an amount by which the tape-shaped recording medium travels from the vicinity of the position where the tape-shaped recording medium was located at the start time of the immediately previous recording; and (f) disabling means for disabling the operation of said operating member, according to an output of said detecting means.

12. An apparatus according to claim 11, wherein said control means causes said transporting means to transport the tape-shaped recording medium by a first predetermined amount in the direction opposite to the direction in which the tape-shaped recording medium is transported during the recording, after the signal has been recorded by said recording means, and brings the tape-shaped recording medium to a stop when the first predetermined amount is reached.

13. An apparatus according to claim 12, wherein said control means causes said transporting means to transport the tape-shaped recording medium from a pause state in the same direction as that in which the tape-shaped recording medium is transported during the recording, and causes said recording means to start the recording of the signal when the tape-shaped recording medium is transported by a second predetermined amount smaller than the first predetermined amount.

14. An apparatus according to claim 13, wherein the predetermined amount by which the stop position where the tape-shaped recording medium is brought to a stop by said control means is shifted from the position where the tape-shaped recording medium was located during the immediately previous recording pause corresponds to a difference between the first predetermined amount and the second predetermined amount.

15. An apparatus according to claim 14, wherein said control means is provided with pulse generating means for generating a pulse signal according to a travel of the tape-shaped recording medium and counting means for counting the pulse signal, and initializes said counting means in response to a start of the recording of the signal by said recording means.

16. An apparatus according to claim 15, wherein said control means is operative in response to an operation of said operating member for causing said transporting means to transport the tape-shaped recording medium to a vicinity of an immediately previous recording start position, by using a count value of said counting means, and then causing said transporting means to transport the tape-shaped recording medium by the first predetermined amount in the direction opposite to the direction in which the tape-shaped recording medium is transported during the recording, and bringing the tape-shaped recording medium to a stop when the first predetermined amount is reached.

17. A signal recording apparatus comprising:

(a) transporting means for transporting a tape-shaped recording medium along a length thereof;

(b) recording means for performing recording of a signal on the tape-shaped recording medium;

(c) operating member;

(d) control means operative in response to an operation of said operating means for causing said transporting means to transport the tape-shaped recording medium to a vicinity of a position where the tape-shaped recording medium was located at a start time of immediately previous recording;

(e) detecting means for detecting an amount by which the tape-shaped recording medium travels from the vicinity of the position where the tape-shaped recording medium was located at the start time of the immediately previous recording; and (f) disabling means for disabling the operation of said operating member, according to an output of said detecting means.

18. An apparatus according to claim 17, wherein said control means is provided with pulse generating means for generating a pulse signal according to a travel of the tape-shaped recording medium, counting means for counting the pulse signal, and initializing means for initializing said counting means in response to a start of the recording of the signal by said recording means.

19. An apparatus according to claim 18, wherein said control means controls an operation of said transporting means by using an output of said counting means.

20. An apparatus according to claim 17, wherein said control means is capable of accepting the operation of said operating member only when said transporting means holds the tape-shaped recording medium in a stopped state.

21. A signal recording apparatus comprising:
(a) transporting means for transporting a tape-shaped recording medium along a length thereof;
(b) recording means for performing recording of a signal on the tape-shaped recording medium;
(c) operating member;
(d) control means operative in response to an operation of said operating member for causing said transporting means to transport the tape-shaped recording medium to a vicinity of a position where the tape-shaped recording medium was located at a start time of immediately previous recording;
(e) detecting means for detecting a time period which elapses after approximately the start time of the immediately previous recording; and
(f) disabling means for disabling the operation of said operating member, according to an output of said detecting means.

22. An apparatus according to claim 21, wherein said detecting means is provided with time measuring means and initializing means for initializing said time measuring means.

23. An apparatus according to claim 21, wherein said control means is capable of accepting the operation of said operating member only when said transporting means holds the tape-shaped recording medium in a stopped state.

24. An apparatus according to claim 21, wherein said control means is capable of accepting the operation of said operating member only when said transporting means holds the tape-shaped recording medium in a stopped state or only when said recording means is in operation.

25. An apparatus according to claim 21, further comprising disabling means for disabling the operation of said operating member.

26. A signal recording apparatus comprising:
(a) transporting means for transporting a tape-shaped recording medium along a length thereof;
(b) recording means for performing recording of a signal on the tape-shaped recording medium;
(c) an operating member;
(d) control means operable only when said transporting means holds the tape-shaped recording medium in a stopped state or only when said recording means is in operation, and operative in response to an operation of said operating member for causing said transporting means to transport the tape-shaped recording medium to a vicinity of a position where the tape-shaped recording medium was located at a start time of immediately previous recording;
(e) detecting means for detecting an amount by which the tape-shaped recording medium travels from the vicinity of the position where the tape-shaped recording medium was located at the start time of the immediately previous recording; and
(f) disabling means for disabling the operation of said operating member, according to an output of said detecting means.

27. A signal recording apparatus comprising:
(a) transporting means for transporting a tape-shaped recording medium along a length thereof;
(b) recording means for performing recording of a signal on the tape-shaped recording medium;
(c) operating member;
(d) control means operative in response to an operation of said operating member for causing said transporting means to transport the tape-shaped recording medium to a vicinity of a position where the tape-shaped recording medium was located at a start time of immediately previous recording;
(e) disabling means for disabling the operation of said operating member; and
(f) display means for displaying whether said operating member is enabled, according to an operation of said disabling means.

28. An apparatus according to claim 27, wherein only when said transporting means holds the tape-shaped recording medium in a stopped state, said control means is capable of accepting the operation of said operating member and said display means is capable of operating.

29. An apparatus according to claim 27, wherein only when said transporting means holds the tape-shaped recording medium in a stopped state or only when said recording means is in operation, said control means is capable of accepting the operation of said operating member and said display means is capable of operating.

30. An apparatus according to claim 27, wherein said recording means performs recording of a video signal and said display means displays an image according to the video signal together with a display indicating whether said operating member is enabled.

31. An apparatus according to claim 30, wherein said display means has combining means for combining the video signal with a character signal associated with the display indicating whether said operating member is enabled.

32. A signal recording apparatus comprising:
(a) transporting means for transporting a tape-shaped recording medium along a length thereof;
(b) recording means for performing recording of a signal on the tape-shaped recording medium;
(c) reproducing means for reproducing a signal from the tape-shaped recording medium;
(d) an operating member;
(e) control means operative in response to an operation of said operating member for causing said transporting means to transport the tape-shaped recording medium to a vicinity of a position where the tape-shaped recording medium was located at a start time of immediately previous recording, said control means being capable of causing said reproducing means to operate while the tape-shaped recording medium travel is being made to travel by said transporting means;
(f) detecting means for detecting an amount by which the tape-shaped recording medium travels from the vicinity of the position where the tape-shaped recording medium was located at the start time of the immediately previous recording; and (g) disabling means for disabling the operation of said operating member, according to an output of said detecting means.

33. An apparatus according to claim 32, further comprising means for cancelling the operation of said operating means.

34. A signal recording apparatus comprising:
(a) transporting means for transporting a tape-shaped recording medium along a length thereof;
(b) recording means for performing recording of a signal on the tape-shaped recording medium;
(c) reproducing means for reproducing a signal from the tape-shaped recording medium;
(d) first instruction means;
(e) first control means operative in response to an instruction of said first instruction means for causing said transporting means to transport the tape-shaped recording medium to a vicinity of a position where the tape-shaped recording medium was located at a start time of immediately previous recording;
(f) second instruction means capable of outputting an instruction after the instruction of said first instruction means; and
(g) second control means operative in response to an instruction of said second instruction means for causing said transporting means to transport the tape-shaped recording medium to a vicinity of a position where the tape-shaped recording medium was located when an immediately previous instruction by said first instruction means was executed.

35. An apparatus according to claim 34, wherein said control means is capable of accepting the instruction of said first instruction means only when said transporting means holds the tape-shaped recording medium in a stopped state.

* * * * *

UNITED STATES PATENT AND TRADEMARK OFFICE
CERTIFICATE OF CORRECTION

PATENT NO. : 5,339,200
DATED : August 16, 1994
INVENTOR(S) : Shinichi Koyama et al.

It is certified that error appears in the above-identified patent and that said Letters Patent is hereby corrected as shown below:

Col. 4, line 62. Change "pause —>" to -- pause 2 —> --.

Col. 5, line 6. Change "point-" to -- point G --.

Signed and Sealed this

Twenty-ninth Day of November, 1994

Attest:

BRUCE LEHMAN

Attesting Officer    Commissioner of Patents and Trademarks